Figure 1:
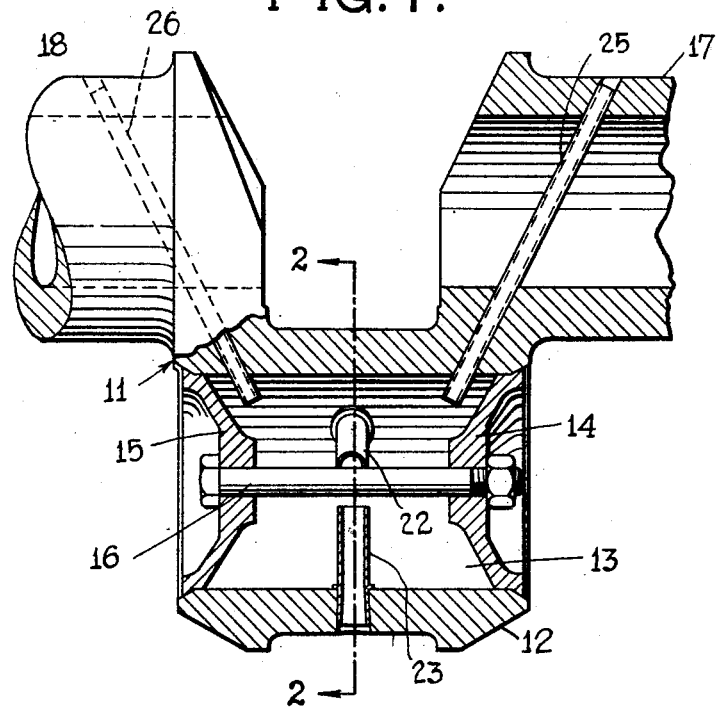

Aug. 30, 1932.  C. G. CARVELLI  1,874,444
OILING SYSTEM
Filed March 14, 1931

INVENTOR
CARL G. CARVELLI.
BY his ATTORNEY

Patented Aug. 30, 1932

1,874,444

UNITED STATES PATENT OFFICE

CARL GUSTAF CARVELLI, OF BUFFALO, NEW YORK, ASSIGNOR TO WRIGHT AERONAUTICAL CORPORATION, A CORPORATION OF NEW YORK

OILING SYSTEM

Application filed March 14, 1931. Serial No. 522,578.

This invention relates to internal combustion engines and more particularly to specific mechanism comprising a part of the oiling system for such an engine for insuring an adequate supply of oil to the crankshaft of said engine.

Prior to my invention, internal combustion engines have been constructed provided with tubes for distributing oil through the crankshafts from the main crankshaft bearings to the offset crank bearings. An example of this construction is shown in a patent to Arthur Nutt, Number 1,739,690. Moreover, as is shown in a patent to Chilton, Number 1,674,191, tubes have been provided having their ends protruding into the interior of the crankshaft. The tubes shown in the last named patent, however, are provided merely for the purpose of preventing the passage of impurities in the oil to the offset bearings.

I have discovered that in the operation of an internal combustion engine having an unbalanced crankshaft at exceedingly high speeds, centrifugal force tends to cause the crankshaft to hug one side of the crankshaft bearing. There is, therefore, a certain area of the journal which is in constant contact with the main bearing. Obviously, if the oil is to enter this bearing it must do so when the hole in the journal passes the oil feed hole in the bearing. I have discovered, moreover, in view of the above tendency that it is sometimes necessary to drill holes around the periphery of the crankshaft and around the periphery of the main bearing or to cut a groove either in the bearing or in the crankshaft.

I have discovered, moreover, that in the operation of such an engine at exceedingly high speeds centrifugal force tends to cause the oil at times to flow out of the hollow journal through one or more of the inactive holes back to the main bearing and to be lost through the main bearing and into the crankcase. Thus the main bearing may be plentifully supplied with oil while the connecting rod bearings are insufficiently lubricated. I have found also that it is very difficult to retain an adequate supply of oil in the hollow main journal for the supply of oil therefrom to the crankpin bearings regardless of the number of holes whenever an engine having narrow bearings of large diameter is revolved at high speeds. I have found that in certain types of engines when turning at speeds of 2900 or more R. P. M., the centrifugal force on the oil in the journal and crankpin bearings exhausts the oil faster than it can be supplied in the conventional method.

One of the objects of this invention is to obtain efficient oiling of the bearings of an internal combustion engine.

A further object is to get an adequate supply of oil into the main crankshaft journal of an internal combustion engine.

A further object is to keep an adequate supply of oil in said main crankshaft journal so that it may flow to the crankpin bearings.

Further objects will be apparent from a reading of the subjoined specification and claims and from a consideration of the accompanying drawing.

Figure 2:
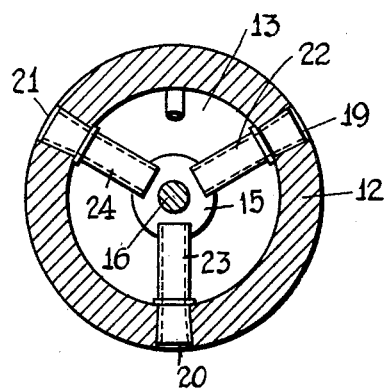

In order to explain the invention more clearly, one embodiment thereof is shown in said drawing, in which:

Fig. 1 is a view in elevation of part of a crankshaft of an internal combustion engine having parts shown in section; and Fig. 2 is a sectional view taken on line 2—2 of Fig. 1.

In general, the structure disclosed for illustration of my invention comprises a partially hollow crankshaft 11 formed with a hollow main journal 12 enclosing an oil reservoir 13 formed within the hollow of the journal. Caps 14 and 15 secured to each other by a bolt 16 close the ends of the reservoir 13. The crankshaft is also formed with offset hollow crankpin journals 17 and 18.

Means are provided for supplying oil to the hollow reservoir 13. The journal 12 is provided with a plurality of oil holes such as 19, 20 and 21 and inserted within these holes are the tubes 22, 23 and 24, respectively. The main bearing (not shown) is also provided with a plurality of holes adapted at times to register with the holes 19, 20 and 21 and to supply oil thereto. Thus oil is introduced under pressure through the holes in the bearing, through the holes 19, 20 and 21 and through the tubes 22, 23 and 24 into the reservoir 13. By reason of the tubes 22, 23 and 24, oil which has been pumped into the interior of the reservoir is substantially prevented from being forced out by centrifugal force through the holes 19, 20 and 21 due to the fact that the inner ends of the tubes are so near the center of rotation that centrifugal force is small.

Means are provided so that oil may pass outward from the reservoir 13 to the crankpin bearings adjacent to the journals 17 and 18. To this end tubes 25 and 26 protrude into the reservoir 13 and extend outward through the metal of the offset portion of the crankshaft to the above mentioned crankpin journal. It is to be noted that the inner ends of the tubes 25 and 26 extend inward within the reservoir a distance less than the distance to which the tubes 21, 22 and 23 protrude. Thus the normal level of the oil in the reservoir is above the inner ends of said tubes 25 and 26. Therefore, substantially regardless of the pressure from the pump, oil will flow outward along the tubes 25 and 26 due to the action of centrifugal force.

During low speed operation of the motor the pressure of the pump may be sufficient to entirely fill the reservoir 13. In that case the tubes 21, 22 and 23 minimize the passage of oil outward from the reservoir 13 to the bearing for the main journal 12. However, when the engine is speeded up to speeds approximately 2900 R. P. M. the function of the tubes in maintaining a sufficient supply of oil within the reservoir 13 increases in importance inasmuch as there would otherwise be a great tendency for the oil in the reservoir to pass outward to the main crankshaft bearing through the oil holes 19, 20 and 21. However, in view of the near approach of the inner end of the tubes to the center of rotation and the probable low level of the oil in the reservoir, by reason of the use of the tubes this tendency becomes immaterial. It is to be noted that the centrifugal force at the inner end of the tubes 22, 23 and 24 is materially less than the centrifugal force at the internal circumference of the journal 12 due to the fact that the radius of rotation of the inner ends of the tubes is considerably less than the radius of rotation of said holes.

It is to be understood that the above described embodiment of the invention is for the purpose of illustration only, and various changes may be made therein without departing from the spirit and scope of the invention.

I claim as my invention:

1. In an internal combustion engine, a crankshaft having formed therein an oil chamber, said chamber having formed in its outer wall an oil hole, and a tube projecting inwardly from said oil hole through which oil is delivered under pressure to said chamber.

2. In an internal combustion engine, a crankshaft including a hollow journal having an oil hole formed in the journal wall, and a tube projecting inwardly from said oil hole through which oil is delivered under pressure to the hollow of said journal at a point in the vicinity of the longitudinal center line thereof.

3. In an internal combustion engine, a crankshaft including a hollow journal having a plurality of radial oil holes formed in the journal wall, and tubes projecting inwardly, one from each said oil hole well toward the axis of said journal through which oil is delivered under pressure to the hollow thereof.

4. In an internal combustion engine, a crankshaft having formed therein an oil chamber, and an oil duct through which oil is delivered under pressure to said chamber, the discharge end of said duct being substantially inwardly removed from the defining wall of said chamber.

5. In an internal combustion engine, a crankshaft including a hollow main journal and a journal offset from the axis of said crankshaft, an oil duct being at its discharge end well within the hollow of said main journal and through which oil is delivered under pressure, and an oil duct extending off from the hollow of said main journal to said offset journal, said last mentioned oil duct having its inlet end extending well into the hollow of said main journal.

6. In an internal combustion engine, a crankshaft including a hollow journal having an oil hole formed in the journal wall, and means for substantially preventing oil from passing outward through said oil hole comprising a tube fitted in said oil hole and extending inwardly a substantial distance into said hollow journal.

In testimony whereof I hereunto affix my signature.

CARL GUSTAF CARVELLI.